United States Patent [19]

Vavra

[11] Patent Number: 4,484,191

[45] Date of Patent: Nov. 20, 1984

[54] TACTILE SIGNALING SYSTEMS FOR AIRCRAFT

[76] Inventor: George S. Vavra, 12420 Saddlehorn Trail, Scottsdale, Ariz. 85259

[21] Appl. No.: 388,480

[22] Filed: Jun. 14, 1982

[51] Int. Cl.³ .................... G08B 23/00; H01H 35/02; H01H 35/14

[52] U.S. Cl. ................................ 340/965; 340/967; 340/407; 200/61.52

[58] Field of Search ............... 340/27 AT, 27 R, 407, 340/965, 967, 974, 975; 200/61.52; 33/328

[56] References Cited

U.S. PATENT DOCUMENTS

| | | | |
|---|---|---|---|
| 821,393 | 5/1906 | Wright. | |
| 2,682,042 | 6/1954 | Harcum | 340/407 |
| 2,754,505 | 7/1956 | Kenyon | 340/407 |
| 3,089,119 | 5/1963 | Staples | 340/27 R |
| 3,269,685 | 8/1966 | Wallace | 200/61.52 |
| 3,691,520 | 9/1971 | Nordstrom | 340/27 AT |
| 3,701,092 | 10/1972 | Hasbrook | 340/27 AT |
| 3,706,970 | 12/1972 | O'Keefe | 340/27 AT |
| 3,852,710 | 12/1974 | Hernandez | 340/27 AT |
| 3,902,687 | 9/1975 | Hightower | 340/407 |
| 3,924,262 | 12/1975 | Melancon | 340/27 AT |

Primary Examiner—James J. Groody
Attorney, Agent, or Firm—Cahill, Sutton & Thomas

[57] ABSTRACT

A system for tactilely alerting an aircraft pilot that the aircraft is in an uncoordinated turn condition and for indicating to the pilot the control adjustments required to correct the turn condition. The system includes a device for sensing the turn condition of the aircraft and a pair of tactile sensation generators in the vicinity of the pilot's legs. The condition sensing device controls activation of one or the other of the tactile sensation generators which indicates to the pilot which foot to depress on the rudder control to return to coordinated flight.

1 Claim, 8 Drawing Figures

TACTILE SIGNALING SYSTEMS FOR AIRCRAFT

TECHNICAL FIELD

This invention deals with improving the safety of manned flight by alerting the aircraft pilot that his aircraft is in an uncoordinated turn condition and for indicating to the pilot control corrections required to re-establish a coordinated turn. It is a significant feature of this invention that instructions to the pilot to correct the turn are given tactilely so that the pilot's senses of sight and sound can be utilized elsewhere for safe operation of the aircraft.

BACKGROUND ART

The basic principles of control of aircraft through coordinated turns has been well understood since it was explained by Orville and Wilbur Wright in their 1906 U.S. Pat. No. 821,393 entitled "Flying Machine". Turning of a modern aircraft is accomplished by actuating small movable panels, or ailerons, on the wing to cause the aircraft to bank, i.e., rotate about its longitudinal axis. The turn is accomplished smoothly, however, only when a degree of rudder control also is imparted. For each aircraft there is a particular amount of rudder control that must be employed for each angle of bank of the aircraft in order to achieve a so-called coordinated turn.

Various instruments have been devised to indicate to the pilot whether or not he is executing a coordinated turn. One of the oldest and most reliable of such instruments is the ball bank instrument which consists of a metal ball inside a liquid filled, curved transparent tube. When the aircraft is not turning or is in a coordinated turn the ball rests in the lowermost, middle region of the curved tube. When the aircraft is in an uncoordinated turn, the ball moves away from the middle of the tube towards one end or the other. During initial training, student pilots are often taught to "kick the ball", i.e., depress the rudder pedal with the foot on the same side of the aircraft as the ball has moved away from the middle of the transparent tube. This rudder movement normally tends to return the aircraft to a coordinated turn condition, regardless of whether it has been in a slip or in a skid.

One of the problems with the ball bank instrument is that it is a visual instrument. To observe it, the pilot must take his eyes away from what is transpiring outside the aircraft. This is undesirable when the aircraft is making turns approaching a landing because the pilot's attention is required outside the aircraft for the purpose of lining up with the landing field and for observing any other aircraft that may be in close proximity. And yet, conditions of the aircraft as it is approaching a landing are such as to demand that well coordinated turns be executed by the pilot. Loss of control of an aircraft due to uncoordinated turns at low speed close to the ground can produce serious and often fatal consequences.

Now, systems have been devised in the past to augment the ball bank instrument in alerting the pilot to undesirable attitudes. For example, U.S. Pat. No. 3,701,092, Hasbrook, granted Oct. 24, 1972 for a "Vehicular Attitude Control Display" discloses a system of gyroscopically controlled indicator lights positioned on the pilot's control wheel for signaling undesirable aircraft attitudes. Although it is speculated that only peripheral vision of the pilot need be employed to read these signal lights, nevertheless, at least some portion of the pilot's visual perceptions are employed, thus distracting his attention from activities outside the aircraft and other visual instruments that must be read.

U.S. Pat. No. 3,089,119, Staples, granted May 7, 1973, entitled "Aural Landing Speed System" and No. 3,924,262, Melancon, granted Dec. 2, 1975 entitled "Aural Warning Apparatus" disclose systems for giving an audio indication to the pilot that the attitude of the aircraft is not correct. Although such systems spare the pilot's visual senses, they can be distracting to his hearing which often upon landing is employed in maintaining contact with the control tower and with other aircraft in the immediate vicinity.

There is thus a need for a simple system for alerting the pilot to an uncoordinated turn and for indicating to the pilot the control corrections required to be made, all without impinging upon his senses of sight and sound so as not to distract these senses from receiving other valuable information that he needs to safely manipulate the aircraft.

DISCLOSURE OF INVENTION

The pilot alerting system of this invention employs means for sensing whether the aircraft is in a coordinated or uncoordinated turn condition and in the preferred mode of carrying out the invention, this sensing means employs a conventional ball bank instrument. Unlike prior instruments, however, this instrument need not be visually perceived by the pilot. Instead, the position of the ball is sensed, preferably photoelectrically, and the signals thereby generated are sent to an amplifier which in turn energizes one or the other of a pair of tactile sensation generators located in the vicinity of the pilot's legs. These generators may take the form of vibrators located in the cushion of the pilot's seat and which are capable, when activated, of imparting a vibrating sensation to one or the other leg of the pilot, thus giving him a tactile signal of which foot to move to correct the position of the rudder to give a coordinated turn condition. Thus, the pilot is alerted to the condition of the aircraft and is given an indication of the correction required, all without requiring him to employ his senses of sight or sound which can be otherwise occupied.

BEST MODE FOR CARRYING OUT THE INVENTION

Figure 1A:
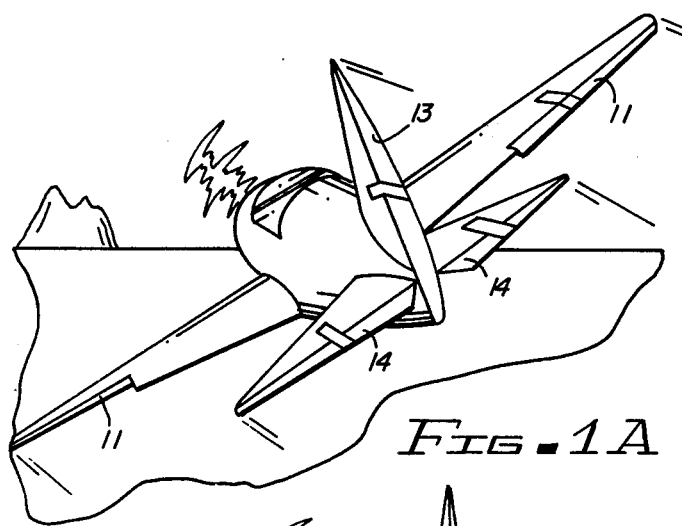
FIG. 1A is a perspective view of an aircraft making a coordinated level turn to the left.

The aircraft illustrated in FIG. 1A is executing a level coordinated turn to the left. The turn has been effected by moving the small movable panels, or ailerons 11 located near the outer tips of the wing 12 of the craft. The ailerons, as shown, are deflected in opposite directions to cause the aircraft to roll, or bank, about its longitudinal axis. This maneuver converts some of the upward lifting force of the wing 12 to the side of the aircraft, causing it to turn in flight. Coordinated turning of the aircraft normally cannot be effected solely by the use of ailerons 11, however, because of their tendancy to create adverse yaw effects, i.e., cause the aircraft to rotate about a vertical axis. These yaw effects are corrected by use of the vertical rudder 13 located at the rear of the aircraft. A normal coordinated turn for most aircraft with the ailerons 11 positioned to bank the aircraft to the left, as shown in FIG. 1A, requires slight left movement of the rudder 13.

In some turns, particularly high bank, small radius turns, another control of the aircraft, namely the elevator 14 located at the rear of the fuselage, also is employed for precise control. However, the most significant control for achieving coordinated turns at various angles of bank is the rudder 13 and this is the control that the pilot normally uses to correct an uncoordinated turn condition.

Figure 2A:
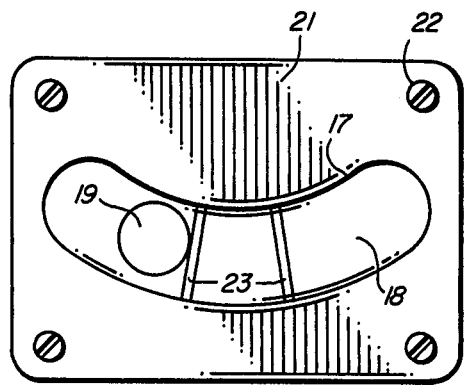
FIG. 2A is an illustration of the same aircraft in an uncoordinated "slipping" turn condition.

In FIG. 2A, there is illustrated an uncoordinated turn of the aircraft in which two little left rudder 13 has been applied for the particular angle of bank created by the ailerons 11 with the result that the aircraft has a tendancy to slide, or slip, downwardly and inwardly of the turn. The aircraft is said to be in a "slip".

Figure 3A:
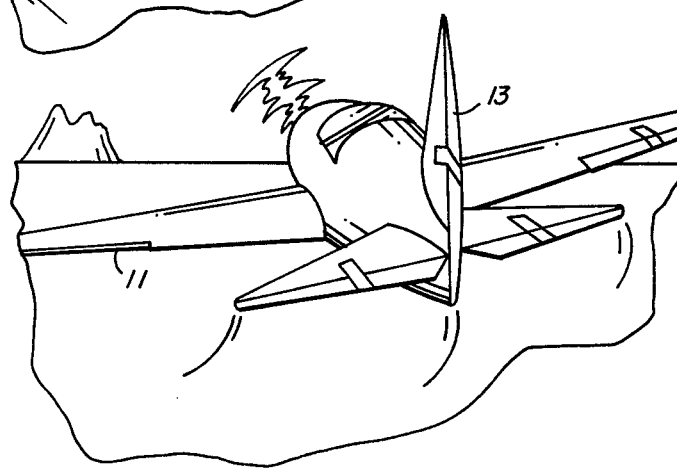
FIG. 3A is a view of the aircraft in an uncoordinated "skidding" turn condition.

In FIG. 3A, there is illustrated an uncoordinated turn condition in which an excessive amount of left rudder 13 has been applied for the particular angle of bank that has been created by the ailerons 11. With these control settings the aircraft skids outwardly in the turn in a condition commonly called a "skid".

Both of the uncoordinated conditions of slip and skid can be hazardous when allowed to occur in slow speed turning flight close to the ground, the condition which frequently exists as an aircraft is flying a pattern for landing. Excessive slip or skid can result in stalling the wing 12 of the aircraft so that it falls into a spin. If there is not sufficient height for the pilot to recover from the spin, the results can be disastrous. It is therefore essential that the pilot be conscious of the degree of coordination of the turns he effects as he pilots the aircraft through its landing pattern. The instrument which is most commonly used to alert the pilot to the condition of his turn is illustrated in FIGS. 1B through 3B and is a ball bank instrument 16.

The ball bank instrument 16 is of fairly simple construction and consists of a curved transparent tube 17, preferably made of glass, which contains a transparent liquid 18, such as a light oil, and a metal ball 19. The ends of the transparent tube 17 are sealed to prevent escape of liquid 18 and ball 19. The instrument usually also possesses a face, or mounting plate 21 which can be fastened to the instrument panel of the aircraft by means of screws 22.

Figure 1B:
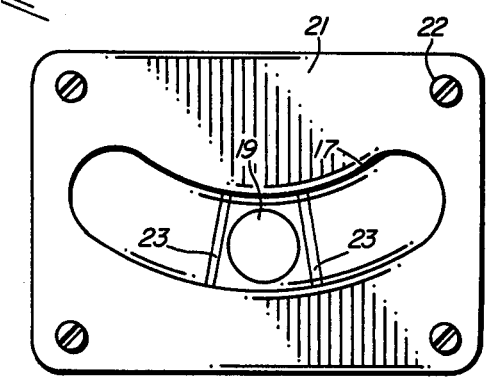
FIG. 1B is a face view of a ball bank instrument as it appears when indicating a coordinated turn condition of FIG. 1A.

When the aircraft is in level flight or is making a coordinated turn, such as is illustrated in FIG. 1A, the ball bank instrument 16 has the appearance shown in FIG. 1B in which the ball 19 rests in the lowermost, middle, region of tube 17. In aviation parlance, the ball 19 is said to be "centered". This position of the ball is normally marked by a pair of stripes or bands 23 painted or etched on the surface of curved tube 17.

Figure 2B:
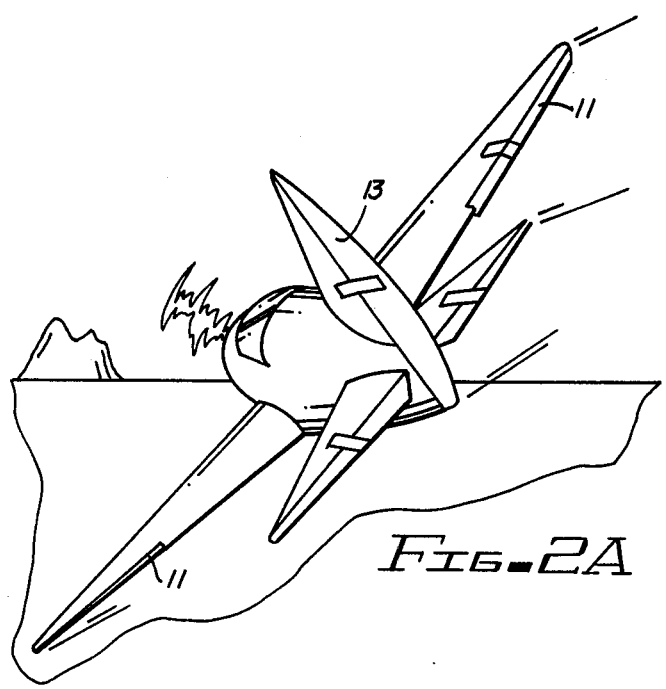
FIG. 2B shows the ball bank instrument indicating the turn condition of the aircraft of FIG. 2A.

When the aircraft is in a slipping condition in a left turn, as is illustrated in FIG. 2A, the ball bank instrument 16 has the appearance shown in FIG. 2B in which the ball 19 has moved away from its "centered" position toward the left end tube 17.

Figure 3B:
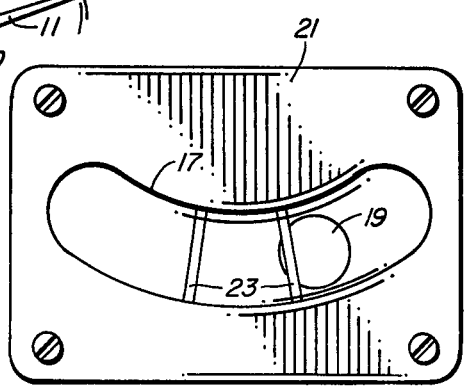
FIG. 3B shows the ball bank instrument indicating the turn condition of the aircraft of FIG. 3A.

When the aircraft is in an uncoordinated skidding turn to the left, as illustrated in FIG. 3A, the ball bank instrument 16 assumes the appearance shown in FIG. 3B in which the ball 19 has moved away from its "centered" position to the right in the tube 17.

The operation of instrument 16 is such that the ball 19 moves in the direction of the turn if the aircraft is slipping and in a direction opposite the turn if the aircraft is skidding. Thus, the pilot by observing the ball bank instrument 16 can relatively easily determine the precise condition of the aircraft. The pilot will also have learned what corrective measures to take with the controls to return the aircraft to the coordinated condition. As mentioned previously, student pilots frequently are taught to "kick the ball" to restore a coordinated turn. This simply means that he depresses the rudder pedal on the side of the aircraft to which the ball has moved to return to coordinated flight. Typically, to correct the slipping condition of the aircraft illustrated in FIG. 2A, the pilot, upon noting the ball 19 to the left of its "centered" position will apply additional leftward movement of the rudder 13 about its vertical axis and this is usually accomplished by pressing on the left foot pedal of the pair that controls the position of the rudder 13. Similarly, to correct the skid condition of FIG. 3A, the pilot would reduce the amount of left rudder 13 that has been applied by pressing the right foot pedal of the rudder control. All of this assumes, of course, that the pilot has the inclination and the time to observe the turn bank instrument 16. It also means that in doing so, his sense of sight has been distracted from activities taking place outside the aircraft and reduces his ability to perceive the attitude of the aircraft relative to the ground and other aircraft in the vicinity. Even with the turn bank instrument 16, the pilot's efficiency is somewhat impaired and the operation of the aircraft is less safe that it should be.

Figure 4:
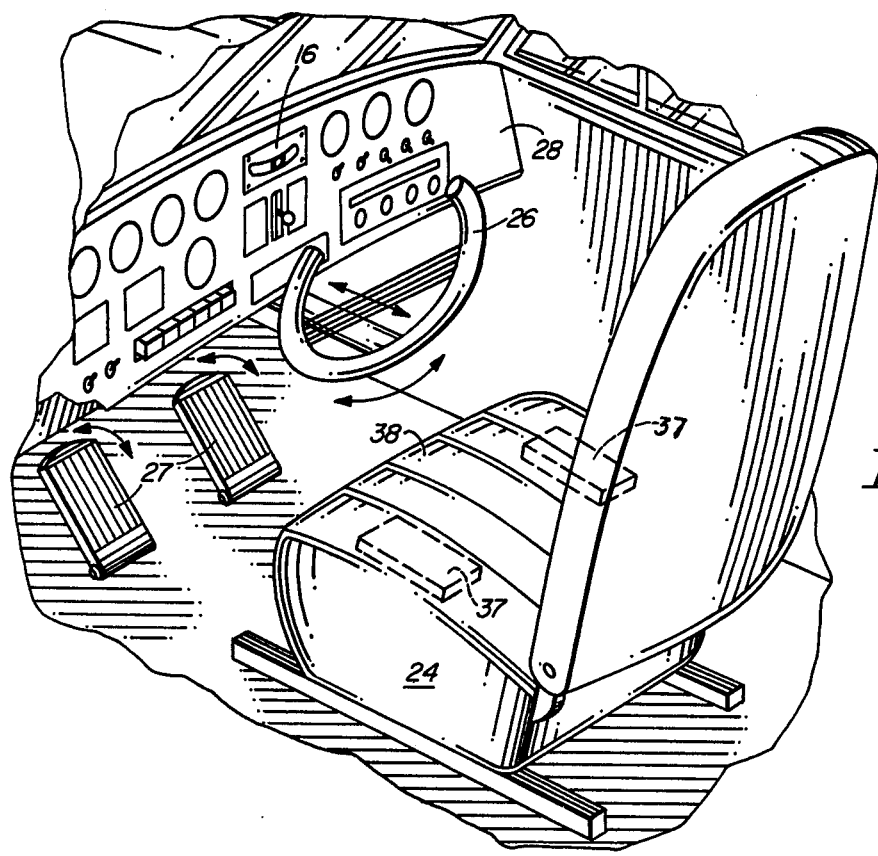
FIG. 4 is a perspective interior view of an aircraft equipped with this invention.

The environment of the pilot and the controls which he manipulates in a conventional aircraft are illustrated in FIG. 4. The pilot normally sits upright in a seat, indicated generally by the reference numeral 24, in a position in which his hands and feet can comfortably reach the controls. The controls themselves usually include a wheel 26 which is capable of being turned to the right and to the left to actuate the ailerons 11 and moved fore and aft to actuate the elevator 14 as indicated by the arrows in FIG. 4. The controls further include a pair of foot pedals 27 for actuating the rudder 13. Normally, as right foot pedal 27 is depressed, the left foot pedal 27 rises and the trailing edge of the rudder 13 is moved to the right. Similarly, when the left foot pedal 27 is depressed, the right foot pedal 27 rises and the rudder 13 is moved to the left. The aircraft also possesses an instrument panel 28 on which are mounted other controls and instruments, such as the ball bank instrument 16. Ball bank instrument 16 is usually mounted in the center of the instrument panel 28 on the center line of the aircraft and in a position to be readily visible to the pilot. In accordance with this invention, means are provided for alerting the pilot to an uncoordinated turn condition of his aircraft without his having to make visual reference to the ball bank instrument 16 itself.

Figure 5:
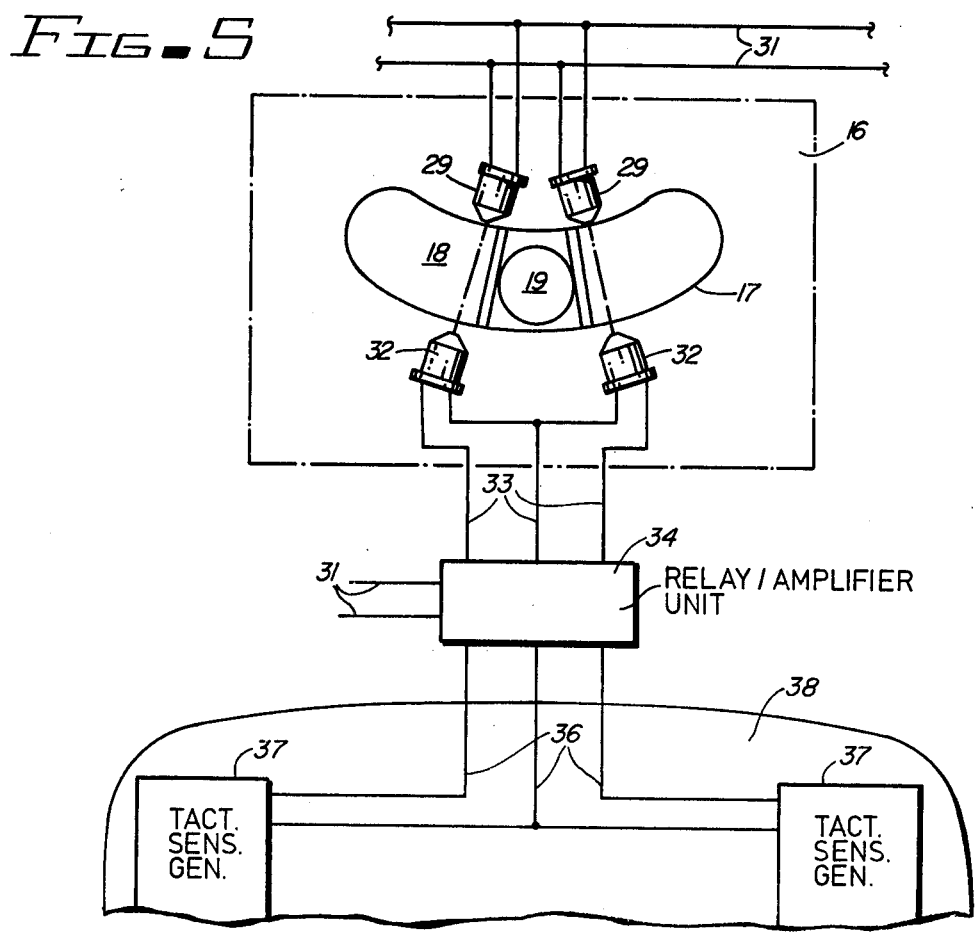
FIG. 5 is a schematic illustration of the principal components of the pilot alerting system of this invention.

The system of this invention includes means for sensing the uncoordinated turn condition of the aircraft and for tactilely alerting the pilot to that condition and indicating to him the control adjustments required to correct the condition. This system is illustrated schematically in FIG. 5 and the sensing means therein employs the basic components of the ball bank instrument 16. This may be the instrument 16 which is actually mounted on the instrument panel of the aircraft or it may be a separate sensing instrument disposed elsewhere in the aircraft. In either event, there is provided as part of the system means for sensing the position of the ball 19 in tube 17. The sensing means comprises a pair of light emitting diodes 29 aimed at the upper surface of the transparent tube 17 in a position to direct light through the tube on opposite sides of the ball 19 when the latter is centered in the tube. Diodes 29 are energized through leads 31 connected to the power supply (not shown) of the aircraft. Movement of the ball 19 within tube 17 is detected by a pair of light sensitive diodes 32 placed adjacent the lower surface of the tube 17 in position to receive light, respectively, from light emitting diodes 29. Light sensitive diodes 32 are capable of significantly altering their conductivity in response to a change in the amount of light falling thereon. Thus, each light sensitive diode 32 can detect the presence of ball 19 between it and its respective light emitting diode 29 and send a signal of that fact through leads 33 to a relay/amplifier unit 34. The relay/amplifier unit 34 responds to signals received from light sensitive diodes 32 by respectively energizing through leads 36 one or the other of a pair of tactile sensation generators indicated at 37.

Tactile sensation generators 37 are positioned, respectively, in close proximity to the legs of the pilot and preferably are mounted just beneath the surface of the seat cushion 38 on which the pilot sits, so that one generator 37 is directly beneath each thigh of the legs of the pilot. The purpose of generators 37 is to deliver a tactile sensation to the pilot to alert him that an uncoordinated turn condition exists in his aircraft and to give him an indication of the control movement to be effected to correct the condition. As discussed previously, this invention contemplates that the pilot will correct the uncoordinated turn by means of the rudder control and the generators 37 indicate that he is to depress either the right or left foot on rudder pedals 27 by generating a tactile sensation in either his right or left leg, respectively. The system works like this. If the ball 19 has moved to the right, indicating either a skid in a left turn or a slip in a right turn, the corrective action to be applied is to move the rudder 13 to the right. With the ball 19 in this position, the right light sensitive diode 32 is deprived of light from its light emitting diode 29 with the result that light sensitive diode sends a signal to the relay/amplifier unit 34 to energize the right hand tactile sensation generator which rests beneath the right leg of the pilot. If the system senses opposite uncoordinated conditions the left sensation generator 37 beneath the left leg of the pilot is energized. Without observing the ball bank instrument or even mentally contemplating the condition of the aircraft, the pilot is given instructions on how to correct his uncoordinated turn condition.

The details of construction of the relay/amplifier unit 34 form no part of the present invention as this component is either commercially available or is easily constructed by a person reasonably skilled in that art. The only operating requirements of the relay/amplifier unit are that it be capable of receiving a fairly low level electrical signal from the light sensitive diodes 32 and have an output of a more powerful signal capable of actuating the tactile sensation generators 37. As for the latter, these may take the form of electromagnetic vibrators or of electro pneumatic expansion devices and only need be capable of alerting the pilot through the sense of touch in his legs.

It should be noted that certain variations can be made in the preferred mode of practicing this invention as has been described heretofore. For example, the tactile sensation generators have been described as being positioned within the cushion 39 of the pilot's seat. It should be apparent that these units can be incorporated in a separate cushion or pad which could rest on top of the normal pilot's seat cushion. Furthermore, if the aircraft were equipped with a bucket-like seat configuration, the generators 37 could be positioned in the sides of the seat so as to deliver the required sensation either to the side of the pilot's legs or to his hips in the vicinity of his legs.

Furthermore, if desired, diodes 29 and 32 can be mounted for adjustable movement closer to or furtheraway from the "centered" position of the ball 19 in instrument 16 to change the degree of sensitivity of the system.

The invention has been described with reference to correcting uncoordinated turn conditions of an aircraft. It should be pointed out that this invention may be useful in signalling the pilot for other uncoordinated conditions of the airplane, for example, an adverse yaw condition such as might be encountered upon the stoppage of one engine of a twin or multi-engine craft. The resulting uneven thrust of the engines on the aircraft would result in the aircraft tending to rotate about its vertical axis, or yaw, and this condition would be sensed by the ball bank instrument and the appropriate corrective control would be indicated to the pilot.

I claim:

1. A pilot alerting system for aircraft with foot actuated rudder control comprising
   means for sensing an uncoordinated flight condition of the aircraft which can be corrected by the application of rudder control, said flight condition sensing means comprising
   a ball bank instrument having a ball moveable in a curved transparent tube, said ball occupying a central region of said tube when the aircraft is in a coordinated flight condition and being moveable away from said central region when the aircraft is in an uncoordinated flight condition, and photoelectric means for detecting movement of said ball away from the central region of said tube,
   and means controlled by said photoelectric means for indicating to the pilot the direction of application of rudder control to correct the uncoordinated flight condition, said indicating means comprising
   a pair of tactile sensation generators located, respectively, in close proximity to the legs of the pilot, each generator, when energized, giving the pilot a tactile indication of the foot to be moved to coordinate the flight condition of the aircraft.

* * * * *